(12) United States Patent
Dean

(10) Patent No.: US 10,557,967 B2
(45) Date of Patent: *Feb. 11, 2020

(54) PROCESS AND SYSTEM FOR ENHANCED DEPTH PENETRATION OF AN ENERGY SOURCE

(71) Applicant: John Dean, Midland, TX (US)

(72) Inventor: John Dean, Midland, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/940,129

(22) Filed: Mar. 29, 2018

(65) Prior Publication Data

US 2018/0299582 A1    Oct. 18, 2018

Related U.S. Application Data

(60) Provisional application No. 62/485,079, filed on Apr. 13, 2017, provisional application No. 62/546,258, filed on Aug. 16, 2017.

(51) Int. Cl.
| | | |
|---|---|---|
| *G01V 11/00* | (2006.01) | |
| *G01V 3/30* | (2006.01) | |
| *E21B 43/25* | (2006.01) | |
| *G01V 1/02* | (2006.01) | |

(52) U.S. Cl.
CPC ............ *G01V 11/007* (2013.01); *E21B 43/25* (2013.01); *G01V 1/159* (2013.01); *G01V 3/30* (2013.01)

(58) Field of Classification Search
None
See application file for complete search history.

(56) References Cited

U.S. PATENT DOCUMENTS

| | | | | |
|---|---|---|---|---|
| 6,328,102 B1 * | 12/2001 | Dean | ...................... | E21B 28/00 166/177.6 |
| 2009/0288820 A1 * | 11/2009 | Barron | ..................... | B01J 13/02 166/249 |
| 2010/0300681 A1 | 12/2010 | Dai | | |

OTHER PUBLICATIONS

International Search Report and Written Opinoin issued in PCT/US18/25181, dated Jun. 29, 2018, 10 pages.

* cited by examiner

*Primary Examiner* — Anuradha Ahuja
(74) *Attorney, Agent, or Firm* — Adolph Locklar

(57) ABSTRACT

The method for enhanced depth penetration of energy into a formation may include mechanically stimulating the formation at a first frequency to induce mechanical stress in the formation and directing electromagnetic radiation towards the formation while mechanically stimulating the formation.

19 Claims, 5 Drawing Sheets

PROCESS AND SYSTEM FOR ENHANCED DEPTH PENETRATION OF AN ENERGY SOURCE

CROSS-REFERENCE TO RELATED APPLICATIONS

This application is a non-provisional application which claims priority from U.S. provisional application Nos. 62/485,079, filed Apr. 13, 2017 and 62/546,258 filed Aug. 16, 2017 both of which are incorporated by reference herein in their entirety.

TECHNICAL FIELD/FIELD OF THE DISCLOSURE

The present disclosure relates generally to enhancing permeability of energy sources in formations. More particularly, the present disclosure relates to enhancing depth penetration of energy sources in formations.

BACKGROUND OF THE DISCLOSURE

Several geophysical and petroleum engineering operations require technologies utilizing energy directed at formations including ground penetrating radar, oil well logging, petroleum exploration, and tertiary recovery. Tertiary recovery may be used to generate or increase the production of additional hydrocarbons from a formation by stimulating the formation. A variety of techniques exist in which the formation is subjected to electrical or thermal stimulation, which allows for the additional production of hydrocarbons. Examples include the stimulation of the formation using microwave radiation, placement of electrodes in the formation in order to stimulate production using electrical currents, and location of a thermal element within a wellbore to elevate the formation temperature. The efficiency of energy directed at a formation may be determined by the penetration depth of the energy, which may be limited by frequency dependent dispersion, scattering, and water content of the formation.

SUMMARY

A method for enhanced depth penetration of energy into a formation is disclosed. The method may include mechanically stimulating the formation at a first frequency to induce mechanical stress in the formation, and directing electromagnetic radiation at a second frequency towards the formation while mechanically stimulating the formation, wherein the first frequency and the second frequency are the same or different.

A method for enhanced depth penetration of energy into a formation is disclosed. The method may include directing electromagnetic radiation towards the formation at a first frequency, and mechanically stimulating the formation while directing electromagnetic radiation at a second frequency at the formation, wherein the first frequency and the second frequency are the same or different.

BRIEF DESCRIPTION OF THE DRAWINGS

The present disclosure is best understood from the following description read with the accompanying figures. Various features are not drawn to scale. Dimensions of features may be arbitrarily increased or reduced for clarity of discussion.

DETAILED DESCRIPTION

Figure 1:
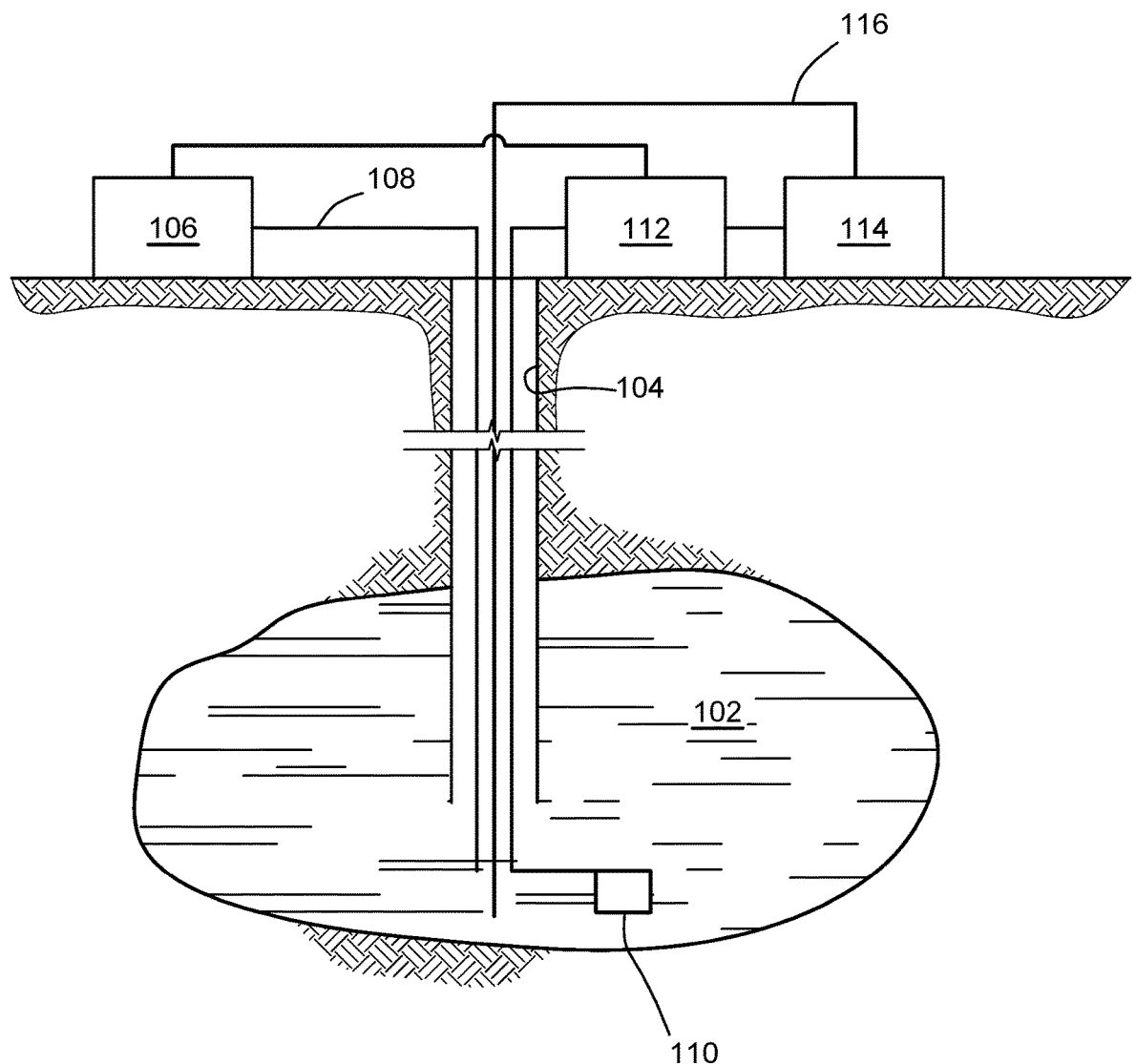
FIG. 1 is a block diagram representation of a system consistent with certain embodiments of the present disclosure.

The following disclosure provides many different examples for implementing different features of various embodiments. Specific examples of components and arrangements are described to simplify the disclosure. These examples are not limiting. The disclosure may repeat reference numerals or letters in the examples. This repetition is for simplicity and clarity and does not dictate a relationship between the embodiments or configurations.

In certain embodiments, the penetration depth of a medium is a measure of how deep an energy applied to the medium, such as electromagnetic energy, can penetrate into a medium. The penetration depth of a medium may be defined as the depth at which the intensity of an energy wave inside the medium falls to $1/e$ of the energy wave intensity's original value at the surface where the energy wave was actuated. As energy is applied to a medium, such as a formation, the energy waves may suffer attenuation, dispersion, and absorption causing decay in the energy waves traversing the medium. The wavelength of an energy wave decreases with increasing frequency and the depth of penetration is dependent on the attenuation of the energy wave in terms of wavelength. An energy wave at a lower frequency will travel a greater distance to penetrate one wavelength into a medium than an energy wave of high frequency. Without being bound by theory, penetration depth may be inversely proportional to the frequency of a stimulation energy applied to a medium.

As depicted in FIG. 1, formation 102 is penetrated by wellbore 104. Formation 102 may be a subsurface formation. Formation 102 may exhibit seismoelectric properties, piezoelectric properties, or both. In certain embodiments, formation 102 may contain piezoelectric elements such as piezoelectric crystals that may have piezoelectric characteristics. In some embodiments, formation 102 includes quartz or silicone dioxide. In certain embodiments, formation 102 does not include quartz or silicone dioxide.

The application of mechanical stress to formation 102 may result in modulation of the resistivity and thus impedance of the formation. Similarly, where quartz or silicone dioxide is present, the application of a mechanical stress may also produce an electric polarization that is proportional to the mechanical stress. In some embodiments, the piezoelectric properties of a quartz-bearing formation in a dry substrate or seismo-electromagnetic properties of a non-quartz-bearing formation in a wet substrate may be used to enhance the penetration of energy into the formation. Movement of fluid through any medium that possesses piezoelectric properties may be increased by increasing the permeability of the medium or increasing the permeability of a preselected portion of the medium.

One or more sensors 110 may be disposed in wellbore 104. In some embodiments, one or more sensors 110 may be mechanical stress transducers, electromagnetic energy sensors, or both. In some embodiments, one or more sensors 110 may be electrically and data coupled with controller 112. One or more sensors 110 may detect at least one of frequency, magnitude, and depth of penetration of mechanical, acoustic and/or electromagnetic stress induced on formation 102, the presence of dynamic polarization of piezoelectric crystals in formation 102, the presence of streaming potentials in formation 102, the impedance of formation 102, and permeability of formation 102, referred to herein as "stress data." Stress data may also include calculated impedance. One or more sensors 110 may include a transmitter or transceiver to communicate stress data to controller 112. Controller 112 may include tangible, non-transitory, computer readable memory media for storage of computer program instructions for carrying out one or more operations as described herein below. In some embodiments, controller 112 may be electrically coupled with mechanical or acoustic stimulation source 106, electromagnetic wave generator 114, or both. Controller 112 may store stress data.

Mechanical stimulation source 106 may mechanically stimulate formation 102 by directing mechanical stimulation energy 108 towards formation 102. Mechanical stimulation source 106 may be on the surface, inside wellbore 104, or in formation 102. Non-limiting examples of a mechanical stimulation source 106 include a vibrator such as a piezoelectric generator, frac fluid with oscillating pressure waves, a vibration truck and a plasma sound source. Mechanical stimulation energy 108 may include mechanical energy, acoustic energy, vibrational energy, and seismic energy. Mechanical stimulation energy 108 may have a specific frequency and magnitude.

Electromagnetic wave generator 114 may be electrically coupled with controller 112. Electromagnetic wave generator 114 may generate and direct electromagnetic radiation 116 towards formation 102. Electromagnetic wave generator 114 may be on the surface, inside wellbore 104, coupled to a drill string, or in formation 102.

In first embodiment, electromagnetic radiation 116 is directed to formation 102 sequentially after mechanical stimulation energy 108 is first directed to formation 102. In a second embodiment, mechanical stimulation energy 108 is directed to formation 102 sequentially after electromagnetic radiation 116 is first directed to formation 102. The description hereinafter is directed to the first embodiment, but applies similarly to the second embodiment.

In the first embodiment, mechanical stimulation energy 108 is directed into formation 102. The specific frequency of mechanical stimulation energy 108 may be chosen to match a desired penetration depth into formation 102. Mechanical stimulation energy 108 may induce mechanical stress on formation 102. In some embodiments, mechanical stimulation energy 108 may cause vibration in formation 102. Mechanical stress induced by mechanical stimulation energy 108 may cause dynamic polarization of piezoelectric elements (where present) in formation 102. In some embodiments, mechanical stress induced by mechanical stimulation energy 108 may cause streaming potentials in formation 102 according to the seismo-electromagnetic characteristics of mechanical stimulation energy 108. The dynamic polarization, streaming potentials or a combination thereof in formation 102 may cause an electrical impedance of formation 102 to be reduced, such as that due to the piezoelectric effect, seismo-electromagnetic effect, or combination thereof.

While mechanical stress is being induced by mechanical stimulation of formation 102, formation 102 may be subjected to electromagnetic radiation 116. The reduction of electrical impedance of formation 102 by mechanical stimulation of formation 102 may allow greater depth penetration of electromagnetic radiation 116.

In certain embodiments, determining the seismoelectric characteristics, piezoelectric characteristics, and combinations thereof of formation 102 may be desirable. The seismoelectric characteristics, piezoelectric characteristics, and combinations thereof of formation 102 may be determined from a sample of formation 102. The sample may be subjected to a mechanical stress at a variety of frequencies to determine a target frequency, where the target frequency is at or near a minimum impedance. In certain embodiments, such as where piezoelectric crystals are present, the mechanical stress may be subjected to a variety of frequencies to determine piezoelectric resonance, or resonance of the sample or any of its components where impedance is at or near a minimum or at or near zero. Values of the target frequency may be determined from mathematical modeling or testing on a representative sample of formation 102. Results of testing on the sample of formation 102 may yield values for induced mechanical stress, impedance minimizing frequencies, resonant frequencies, and the influence of orientation of the induced mechanical stress.

Figure 2:
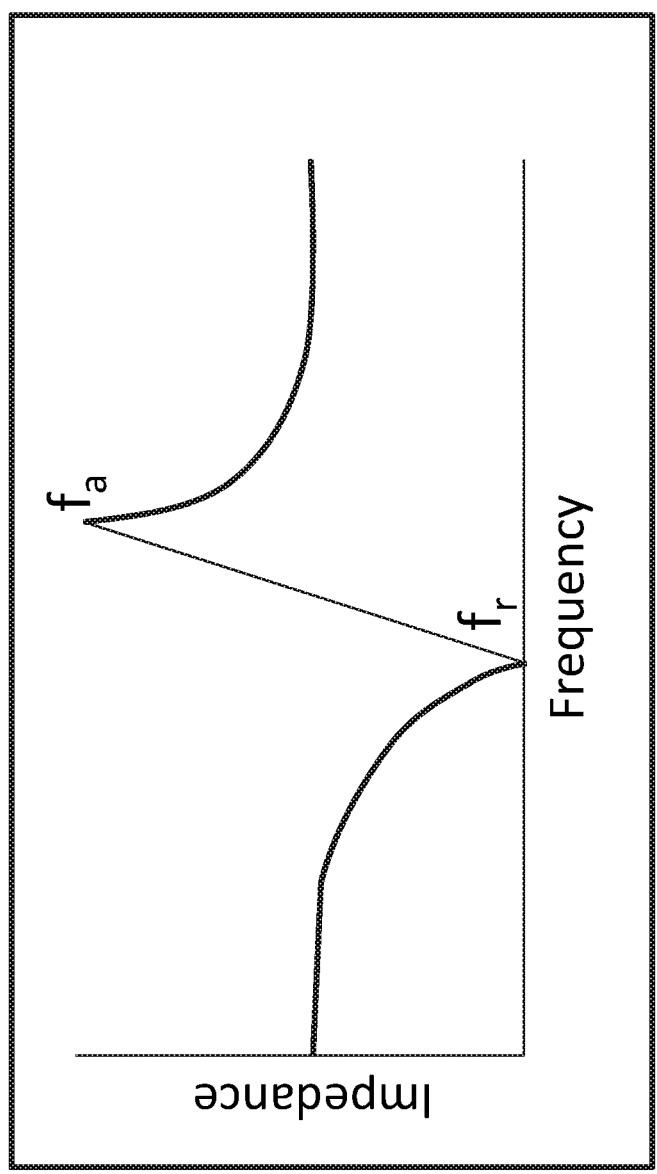
FIG. 2 is a graph of impedance versus frequency for a piezoelectric medium near a resonance consistent with certain embodiments of the present disclosure.

FIG. 2 is a graph of impedance versus frequency for a piezoelectric medium near a resonance frequency where resonant frequency, $f_r$, at the point of minimum impedance and an anti-resonant frequency, $f_a$, at the point of maximum impedance consistent with certain embodiments of the present disclosure.

Figure 3:
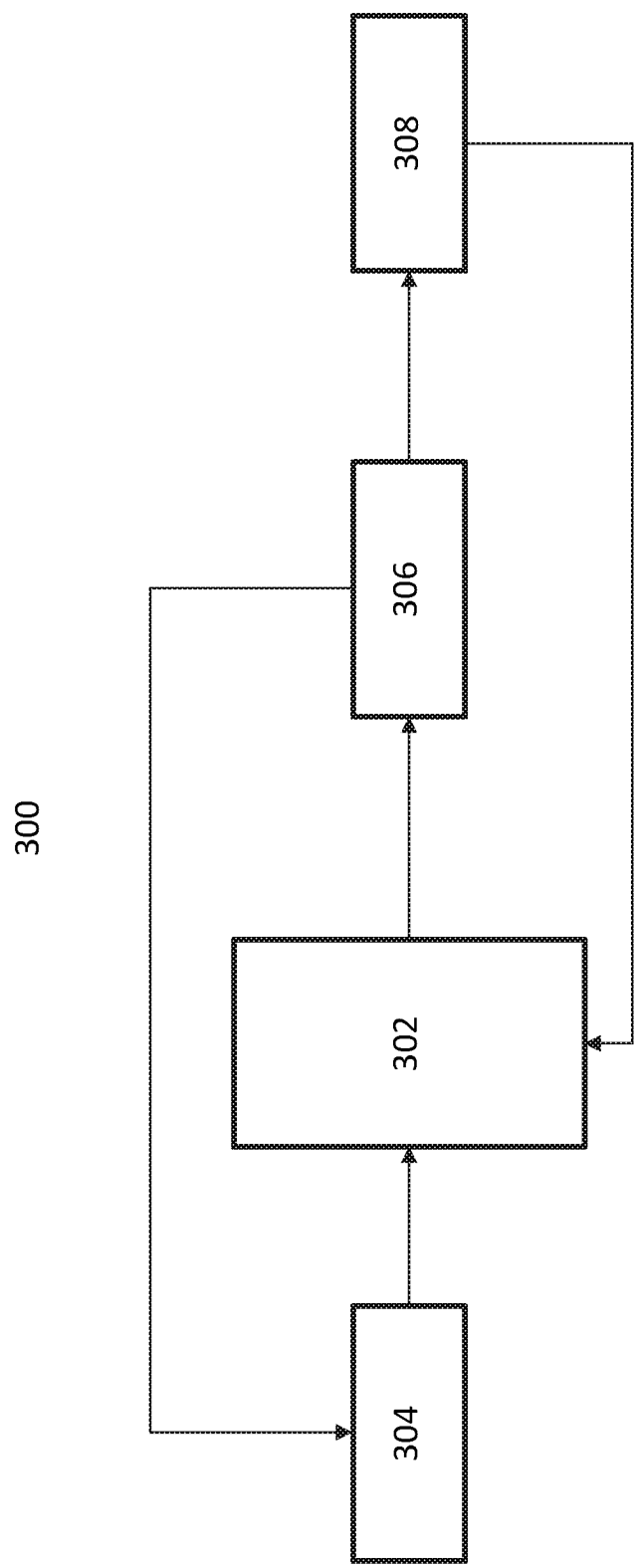
FIG. 3 is a block diagram representing an application of testing stimulation energy on a sample to determine a target frequency consistent with certain embodiments of the present disclosure.

FIG. 3 illustrates testing system 300 for determining the mechanical stress on sample 302 from formation 102. Sample 302 may be stimulated with mechanical stress from mechanical stress generator 304 resulting in electrical energy. Transducer 306 measures the frequency and magnitude of induced mechanical stress, the amplitude of electrical energy generated by sample 302, the presence of dynamic polarization of piezoelectric crystals (where present), and permeability of the sample 302. The mechanical stress input of mechanical stress generator 304 is adjusted until the amplitude of electrical energy reduces the impedance of sample 302. The frequency of the induced mechanical stress when impedance is reduced to a target frequency may be measured. In certain embodiments, the target frequency may be at or near the resonant frequency of sample 302. If additional response is needed, electromagnetic radiation 116 may be applied to sample 302 from electromagnetic source 308; in certain embodiments, electromagnetic radiation 116 may be tuned to match the resonant frequency of sample 302.

Figure 4:
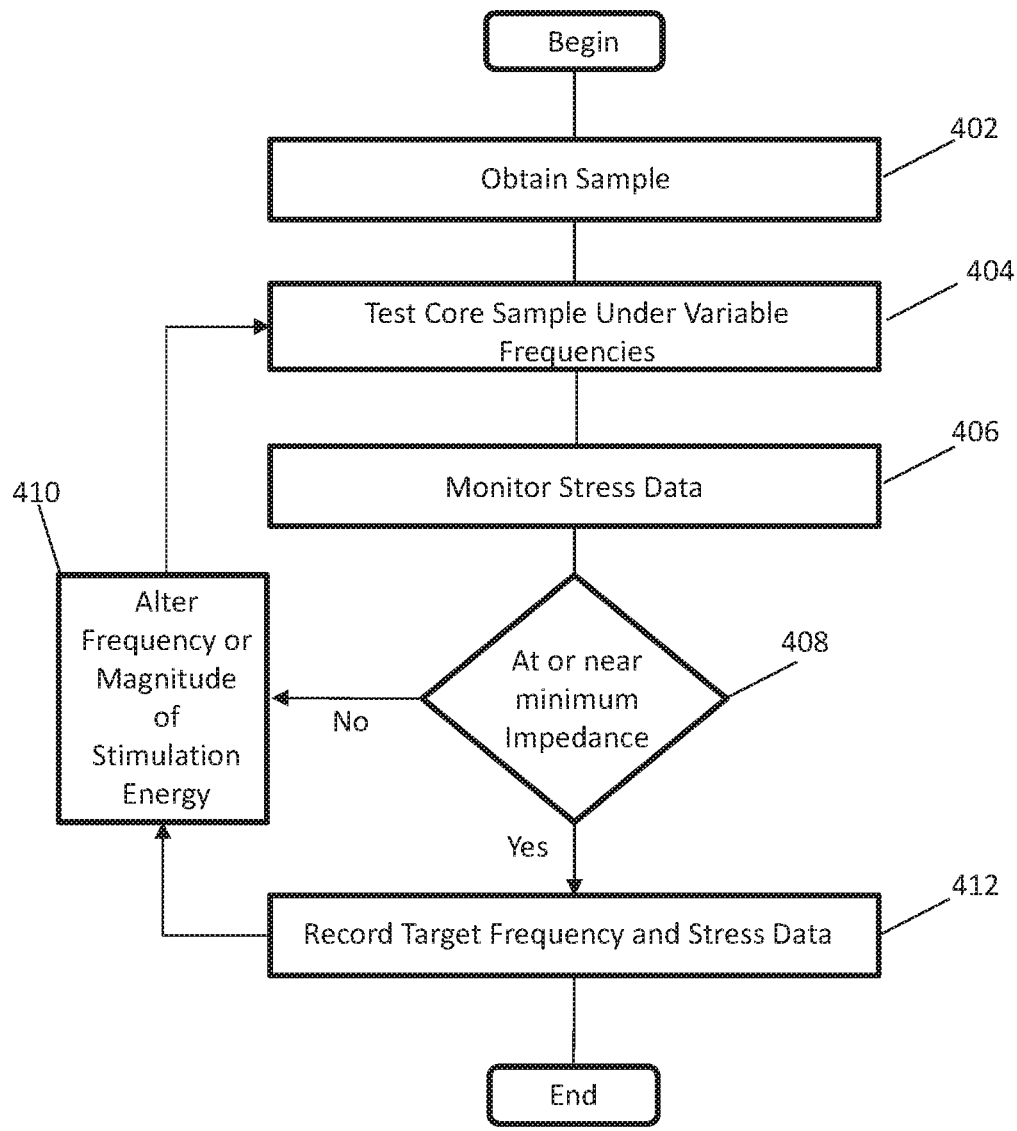
FIG. 4 is a flowchart of a method of determining the target frequency of a sample from a formation consistent with certain embodiments of the present disclosure.

To determine the target frequency of sample 302, sample 302 may be mechanically stressed at a frequency estimated by mathematical modeling or otherwise pre-determined. FIG. 4 is a flowchart representation of a method of determining a target frequency of sample 302 such as from formation 102. Sample 302 of formation 102 may be obtained (402). Sample 302 may be tested by applying variable frequencies of mechanical stimulation energy 108 to sample 302, thereby inducing mechanical stress (404). The stress data may be monitored and recorded (406). Sample 302 may be monitored to determine whether sample 302 is at or near a minimum impedance (408). If not, the frequency and magnitude of mechanical stimulation energy 108 may be altered and sample 302 may be retested (410). In some embodiments, if sample 302 is not at or near a minimum impedance, the mechanical stimulation energy 108 may be adjusted. If sample 302 is at or near minimum impedance, the frequency and characteristics of the mechanical stress, including frequency and magnitude of the stimulating energy, may be recorded (412). In some embodiments, optimized permeability may be monitored. In such an embodiment, if permeability is optimized, the frequency and characteristics of the mechanical stress may be recorded. If permeability is not optimized, the frequency of the mechanical stress may be altered, and the testing of sample 302 may continue until the maximum effect of the mechanical stress is determined. In certain embodiments, the minimum impedance may correspond to the resonant frequency of sample 302.

Stimulation of the medium may be done from any point within, on, or outside the medium. For example, if the sample 302 testing demonstrated any recurrent orientation of the piezoelectric crystals in the medium other than random, the stimulating foci may be placed to maximize the effect. As with sample 302 testing operations, transducers 306 may be used to feedback amplitudes and frequencies of vibration from the mechanical stress on the medium.

Figure 5:
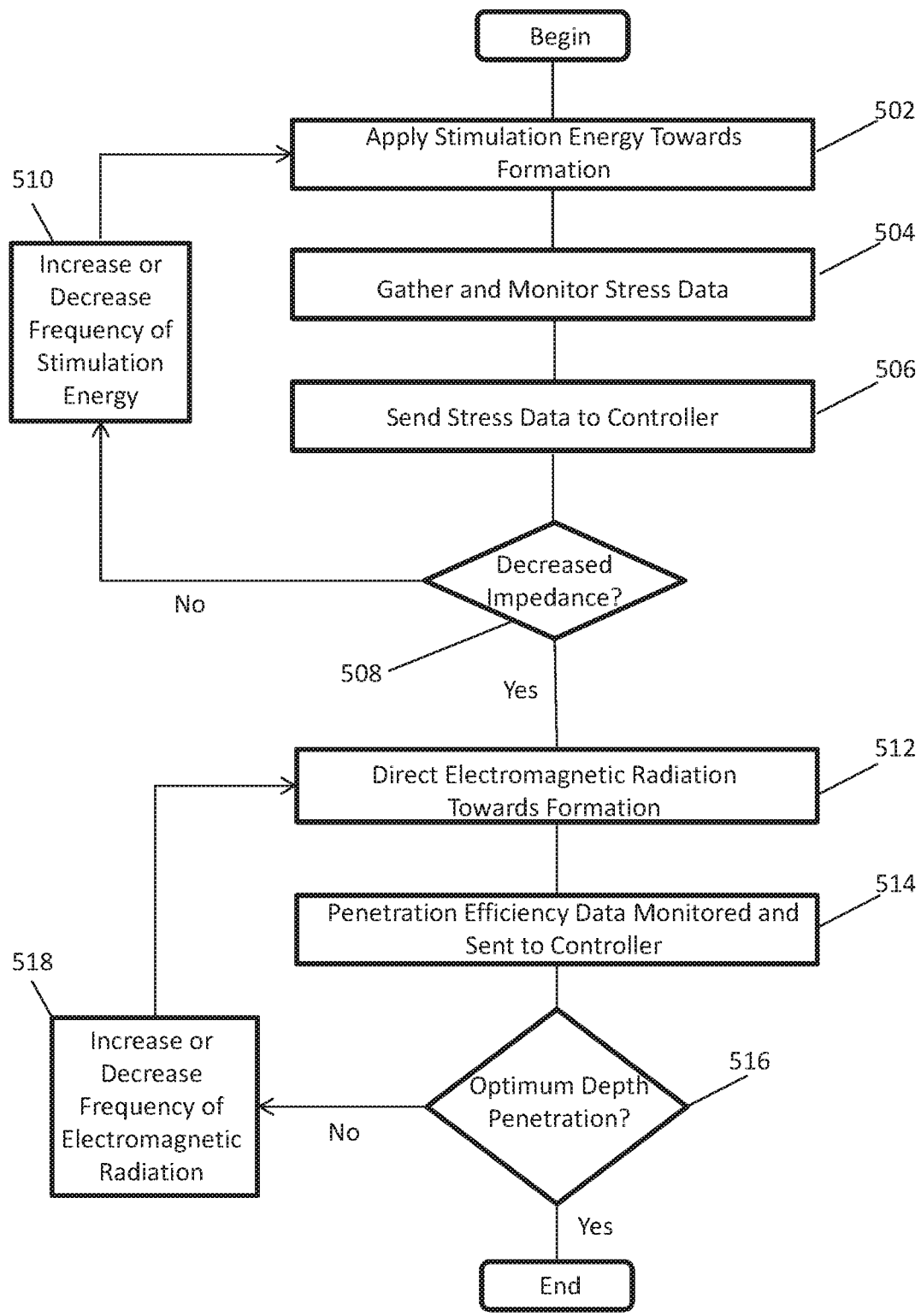
FIG. 5 is a flowchart of the application of stimulation energy of a medium to enhance depth penetration of the medium consistent with embodiments of the present disclosure.

FIG. 5 is a flowchart representation of the application of mechanical stimulation energy 108 by mechanical stimulation source 106 on a medium such as formation 102 to enhance depth penetration of the medium. Formation 102 may be mechanically stimulated by mechanical stimulation energy 108 (502). In some embodiments, mechanical stimulation energy 108 may be applied to formation 102 at a first frequency to induce a mechanical stress in formation 102. In some embodiments, the first frequency may be at a specific, predetermined frequency (such as that determined by mathematical modeling), or experimentally-derived frequency. In certain embodiments, prior to or while applying mechanical stimulation energy 108, a high amplitude mechanical energy impulse may be applied to formation 102. The high amplitude mechanical energy impulse may be applied by mechanical stimulation source 106, or by a different mechanical stimulation source.

One or more sensors 110 may be disposed in formation 102 and stress data may be gathered and monitored (504). In some embodiments, stress data including frequency and magnitude of induced mechanical stimulation energy 108, the amplitude of electrical energy generated by formation 102, the presence of dynamic polarization of piezoelectric crystals in formation 102, the presence of streaming potentials in the formation 102, the depth of penetration of mechanical stimulation energy 108, the impedance of formation 102, and permeability of formation 102 may be gathered and monitored. In certain embodiments, impedance may be measured directly.

The stress data may be sent to controller 112 (506). Formation 102 may be monitored by controller 112 using one or more sensors 110 to determine whether dynamic polarization of the piezoelectric crystals or creation of streaming potentials in formation 102 has occurred to achieve minimum impedance or near minimum impedance (508). In certain embodiments, resonance may be achieved when the impedance of formation 102 is reduced, or near zero. If minimum impedance is not achieved, the first frequency may be increased or decreased based on the stress data (510). In some embodiments, if minimum impedance is not achieved, the magnitude of the mechanical stimulation energy 108 may be increased or decreased based on the stress data.

If minimum impedance or near minimum impedance is achieved, the depth penetration of a subsequent applied energy may be enhanced due to the reduction of impedance. In some embodiments, if minimum impedance or near minimum impedance is achieved, electromagnetic radiation 116 may be directed towards formation 102 (512). In some embodiments, electromagnetic radiation 116 may be directed towards formation 102 while mechanical stimulation energy 108 is applied to formation 102. In some embodiments, electromagnetic radiation 116 may be directed towards formation 102 sequentially. In some embodiments, electromagnetic radiation 116 may be directed towards formation 102 after mechanical stimulation energy 108 is applied to formation 102. In some embodiments, electromagnetic radiation 116 may be applied to formation 102 at a second frequency. The second frequency, magnitude of electromagnetic radiation 116, and the effect of the second frequency on formation 102 including at least the depth penetration of electromagnetic radiation 116 and permeability of formation 102, referred to herein as "penetration efficiency data," may also be monitored by one or more sensors 110. The penetration efficiency data may be sent to controller 112 (514).

Formation 102 may be monitored by controller 112 using one or more sensors 110 to determine whether an optimum or pre-determined depth penetration has occurred (516). In some embodiments, optimum depth penetration occurs where the second frequency is the resonant frequency of the piezoelectric crystals in formation 102, formation 102 itself, or any component of formation 102. In some embodiments, a resonant frequency of formation 102 may be identified by testing a sample 302 of formation 102 and the optimum depth penetration occurs where the second frequency is the resonant frequency of formation 102. In some embodiments, optimum depth penetration occurs where the first frequency and second frequency are harmonically related. When the first frequency and second frequency are harmonically related, frequency dependent dispersion of the electromagnetic radiation may be minimized. In some embodiments, the respective frequencies where the first frequency and second frequency are harmonically related may be determined by testing a sample 302 of formation 102. If optimum depth penetration has not occurred, the second frequency may be increased or decreased to achieve optimum depth penetration in formation 102 (518).

In some embodiments, when the frequency of mechanical stimulation energy 108, the first frequency, on the medium or formation 102 reaches minimum or near minimum impedance, formation 102 may be further stimulated by electromagnetic radiation at a second frequency. The second frequency may be the resonant frequency of formation 102 causing vibration of formation 102. Fatigue fractures may occur throughout formation 102 thus increasing the fracture porosity and permeability of formation 102 in general, which may facilitate the movement of fluid through it. The friction caused by the vibration may increase the temperature of formation 102 lowering the viscosity of the fluids within formation 102 allowing for easier extraction. One or more sensors 110 may be utilized to monitor the amount of vibration within formation 102 and the amount of flow of the fluid from formation 102. In some embodiments, after adding the electromagnetic energy at a second frequency, the frequency of the mechanical energy may be altered, such as to maintain a minimum or near minimum impedance during formation stimulus.

In some embodiments, the second frequency may be the resonant frequency of the fluids in formation 102, including water or hydrocarbons causing an increase in temperature of the fluids in formation 102. The increase in temperature of the fluids in formation 102 may lower the viscosity of the fluids within formation 102 allowing for greater flow between fractures and easier extraction.

In some embodiments, fluids may be lifted from formation 102 utilizing conventional technologies such as artificial or gas lift technologies to lift fluid and hydrocarbons to the surface for further processing. In some embodiments, conventional water flooding technologies may be utilized to direct the flow of hydrocarbon bearing fluids within a hydrocarbon bearing zone. In some embodiments, the frequency of the mechanical stimulation and the electromagnetic radiation applied to formation 102 is adjusted to increase and optimize vibration which is induced in formation 102 and flow of the target substance of formation 102.

Example

Quartz rich, carbonate rich, and clay rich rock samples with high porosity (~30%) and low porosity shale rock samples were selected. The pore space in the rock samples was saturated with 100% air, 100 water, and 100% oil. Three different oil samples were used to prepare oil saturated rock samples. The oil samples were selected based on microwave absorption properties with high polarity, low polarity, and moderate polarity. The air, water, and oil saturated rock samples were irradiated electromagnetically at frequencies ranging from 1 to 6 GHz under pressure. At the end of each test, the dielectric constant ($\varepsilon'$), loss index ($\varepsilon''$), and loss tangent of test mediums were measured with a network analyzer. Electromagnetic wave penetration was calculated for each case.

Electromagnetic wave penetration was determined to be frequency dependent. With lower frequencies, higher penetration depth was obtained for all samples. Air saturated rock samples had poor electromagnetic wave penetration depth regardless of the mineralogy due to enhanced electromagnetic wave scattering in air. For water and oil saturated rocks and for air saturated shale samples with high quartz content, electromagnetic wave penetration was significantly higher. The loss index and loss tangent of materials appeared to determine the effectiveness of electromagnetic wave penetration and loss index and loss tangent were also affected by the oil composition. The ratio of the polar groups (resins to asphaltenes) in crude oil appeared to determine the magnitude of loss index and loss tangent. As the resins to asphlatenes ratio increased, the electromagnetic wave absorption was enhanced. Further, the deeper the reservoir the more effective the electromagnetic wave penetration due to increased pressure.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art may readily use the present disclosure as a basis for designing or modifying other processes and structures for carrying out the same purposes and/or achieving the same advantages of the embodiments introduced herein. One of ordinary skill in the art may make various changes, substitutions, and alterations without departing from the spirit and scope of the present disclosure.

The invention claimed is:

1. A method comprising:
    disposing one or more sensors in a formation;
    determining a target frequency of the formation, wherein the target frequency is a frequency at which a depth of penetration of the formation by mechanical stimulation is at a pre-determined amount and wherein the step of determining the target frequency of the formation comprises:
    a) applying mechanical stimulation energy towards the formation at a testing frequency and at a testing magnitude;
    b) using the one or more sensors to measure the depth of penetration of the mechanical stimulation energy of step a) into the formation;
    c) determining if the depth of penetration measured in step b) is at the predetermined amount;
    d) altering the testing frequency or the testing magnitude of the mechanical simulation energy if the depth of penetration measured in step b) is not at the predetermined amount;
    e) repeating steps a)-d) until the depth of penetration measured in step b) is at the predetermined amount; and
    f) recording the testing frequency and the testing magnitude when the depth of penetration measured in step b) is at the predetermined amount as the target frequency and a target magnitude;
    mechanically stimulating the formation at the target frequency to induce mechanical stress in the formation; and
    directing electromagnetic radiation at an electromagnetic frequency towards the formation while or after mechanically stimulating the formation at the target frequency.

2. The method of claim 1, wherein the target frequency is the resonant frequency of i) piezoelectric crystals in the formation, ii) the formation itself, or iii) any component of the formation.

3. The method of claim 1, wherein the electromagnetic radiation is directed towards the formation after mechanically stimulating the formation.

4. The method of claim 1, wherein the method further comprises identifying a resonant frequency of the formation and increasing or decreasing the electromagnetic frequency to match the resonant frequency of the formation.

5. The method of claim 1, wherein the step of determining the target frequency of the formation comprises:
    obtaining a sample of the formation;
    a) applying electromagnetic energy or mechanical stimulation energy towards the sample at a testing frequency;
    b) measuring an impedance of the sample at the testing frequency;
    c) determining if the impedance of the sample is at a minimum;
    d) altering the testing frequency if the impedance of the sample is not at the minimum;
    e) repeating steps a)-d) until the impedance of the sample is at the minimum; and
    f) recording the testing frequency when the sample is at the minimum as the target frequency.

6. The method of claim 1, further including determining an influence of the orientation of the induced mechanical stress.

7. The method of claim 6, further including the steps of:
    obtaining a sample of the formation;

determining whether piezoelectric crystals in the sample have a recurrent orientation; and placing a stimulating focus of the mechanical stimulation so as to maximize an effect of the mechanical stimulation.

8. The method of claim 1, wherein the target frequency is a frequency at which a depth of penetration of the formation by the electromagnetic radiation is at a pre-determined amount and wherein the step of determining the target frequency of the formation further comprises:

g) applying the electromagnetic radiation towards the formation at a testing frequency and at a testing amplitude;

h) using the sensors to measure the depth of penetration of the electromagnetic stress induced on the formation by the electromagnetic radiation of step g);

i) determining if the depth of penetration measured in step h) is at the predetermined amount;

j) altering the testing frequency or the testing amplitude of the electromagnetic radiation if the depth of penetration measured in step h) is not at the predetermined amount;

k) repeating steps g)-j) until the depth of penetration measured in step h) is at the predetermined amount; and l) recording the testing frequency and the testing amplitude of the electromagnetic radiation when the depth of penetration measured in step h) is at the predetermined amount as the target frequency and a target amplitude.

9. The method of claim 1, wherein the step of determining the target frequency of the formation further comprises:

i) obtaining a sample of the formation;

ii) applying electromagnetic energy or mechanical stimulation energy towards the sample at a testing frequency;

iii) measuring a depth of penetration of the electromagnetic energy or mechanical stimulation energy applied in step ii) into the sample at the testing frequency;

iv) determining if the depth of penetration measured in step iii) is at the pre-determined amount;

v) altering the testing frequency if the depth of penetration measured in step iii) is not at the pre-determined amount;

vi) repeating steps ii)-v) until the depth of penetration measured in step iii) is at the pre-determined amount; and vii) recording the testing frequency when the depth of penetration measured in step iii) is at the predetermined amount as the target frequency.

10. A method comprising:

directing electromagnetic radiation towards a formation at an electromagnetic frequency, determining an electromagnetic target frequency of the formation, wherein the electromagnetic target frequency is a frequency at which an impedance of the formation is at a minimum;

adjusting the electromagnetic frequency to the electromagnetic target frequency; and determining a mechanical target frequency of the formation, wherein the mechanical target frequency is frequency at which a measured depth of penetration of the formation by a mechanical stimulation is at a pre-determined amount;

mechanically stimulating the formation at the mechanical target frequency while or after directing the electromagnetic radiation at the formation;

disposing one or more sensors in the formation, and wherein the step of determining the electromagnetic target frequency of the formation comprises:

a) applying electromagnetic stimulation energy towards the formation at an electromagnetic testing frequency and amplitude;

b) measuring the impedance of the formation at the electromagnetic testing frequency and amplitude using the one or more sensors;

c) determining if the impedance of the formation is at the minimum;

d) altering the electromagnetic testing frequency or amplitude of the electromagnetic simulation energy if the impedance of the formation is not the minimum;

e) repeating steps a)-d) until the impedance of the formation is at the minimum; and f) recording the electromagnetic testing frequency and amplitude when the impedance of the formation is at the minimum as the electromagnetic target frequency and a target amplitude.

11. The method of claim 10, wherein the electromagnetic frequency is a resonant frequency of piezoelectric crystals in the formation.

12. The method of claim 10, wherein the formation is mechanically stimulated after the electromagnetic radiation is directed towards the formation.

13. The method of claim 10, wherein the method further comprises identifying a resonant frequency of the formation and increasing or decreasing the mechanical stimulation frequency to match the resonant frequency of the formation.

14. The method of claim 10, wherein the electromagnetic target frequency is determined experimentally or through mathematical modeling.

15. The method of claim 10, further including, prior to mechanically stimulating the formation at a mechanical stimulation frequency, the step of:

applying a mechanical energy impulse to the formation.

16. The method of claim 10, further including determining an influence of the orientation of the induced mechanical stress.

17. The method of claim 16, further including the steps of:

obtaining a sample of the formation and;

determining whether piezoelectric crystals in the sample have a recurrent orientation; and placing a stimulating focus of the mechanical stimulation so as to maximize an effect of the mechanical stimulation.

18. A method comprising:

a) positioning sensors in a formation;

b) mechanically stimulating the formation at a mechanical stimulation frequency to induce mechanical stress in the formation;

c) directing electromagnetic energy at an electromagnetic frequency towards the formation while mechanically stimulating the formation;

d) measuring depth of penetration of the formation by the mechanical stimulation at the mechanical stimulation frequency using the sensors;

e) determining if the measured depth of penetration of the formation by the mechanical stimulation is at a predetermined amount;

f) altering the mechanical stimulation frequency if the measured depth of penetration of the formation by the mechanical stimulation is not at the predetermined amount;

g) repeating steps d)-f) until the depth of penetration of the formation by the mechanical stimulation is at the predetermined amount; and h) determining if minimal impedance or a pre-determined depth of penetration of the formation by the electromagnetic energy has been achieved;

i) altering the electromagnetic frequency if minimal impedance or the pre-determined depth of penetration of the formation by the electromagnetic energy has not being achieved, and j) repeating steps h)-i) until minimal impedance or the pre-determined depth of penetration of the formation by the electromagnetic energy has been achieved.

19. The method of claim 18, wherein the pre-determined depth of penetration of the formation by the electromagnetic energy or the mechanical stimulation is the depth of penetration of the electromagnetic energy or the mechanical stimulation at the resonant frequency of i) piezoelectric crystals in the formation, ii) the formation itself, or iii) any component of the formation.

* * * * *